United States Patent
Seo et al.

(10) Patent No.: US 8,423,346 B2
(45) Date of Patent: Apr. 16, 2013

(54) DEVICE AND METHOD FOR INTERACTIVE MACHINE TRANSLATION

(75) Inventors: Young Ae Seo, Daejeon (KR); Chang Hyun Kim, Daejeon (KR); Seong Il Yang, Daejeon (KR); Young Sook Hwang, Daejeon (KR); Chang Hao Yin, Daejeon (KR); Eun Jin Park, Busan (KR); Sung Kwon Choi, Daejeon (KR); Ki Young Lee, Daejeon (KR); Oh Woog Kwon, Daejeon (KR); Yoon Hyung Roh, Daejeon (KR); Young Kil Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1226 days.

(21) Appl. No.: 12/204,960

(22) Filed: Sep. 5, 2008

(65) Prior Publication Data
US 2009/0063128 A1 Mar. 5, 2009

(30) Foreign Application Priority Data
Sep. 5, 2007 (KR) .................. 10-2007-0090102
Jul. 9, 2008 (KR) .................. 10-2008-0066395

(51) Int. Cl.
G06F 17/28 (2006.01)
(52) U.S. Cl.
USPC ....................... 704/2; 704/3; 704/4; 704/5
(58) Field of Classification Search .......... 704/2, 3, 704/4, 5, 6, 7, 8
See application file for complete search history.

(56) References Cited

U.S. PATENT DOCUMENTS
4,599,612 A * 7/1986 Kaji et al. ............... 345/635
4,774,666 A * 9/1988 Miyao et al. ............ 704/2
(Continued)

FOREIGN PATENT DOCUMENTS
JP 5-67141 3/1993
JP 11-265381 9/1999
(Continued)

OTHER PUBLICATIONS

Masaru Tomita, et al. "Feasibility Study of Personal/Interactive Machine Translation Systems", *Proceedings of the Conference on Theoretical and Methodologist Issues in Machine Translation of Natural Language*, Colgate University, Hamilton, New York, Aug. 14-16, 1985. (pp. 289-297).

(Continued)

Primary Examiner — Vincent P Harper
(74) Attorney, Agent, or Firm — Staas & Halsey LLP (57) ABSTRACT

Provided are a device and method for interactive machine translation. The device includes a machine translation engine having a morphological/syntactic analyzer for analyzing morphemes and sentences of an original text and generating original text analysis information, and a translation generator for generating a translation and translation generation information on the basis of the original text analysis information, and a user interface module for displaying sentence structures of the original text and the translation, and a relationship between the original text and the translation to a user on the basis of the original text analysis information and the translation generation information, and for receiving corrections to the original text or the translation from the user. The device and method provide a user interface whereby the user can effectively recognize and correct a mistranslated part and a cause of the mistranslation, and rapidly provides a re-translated result according to the correction. Thus, it is possible to perform high-quality translation which satisfies the user.

12 Claims, 6 Drawing Sheets

U.S. PATENT DOCUMENTS

| | | | | |
|---|---|---|---|---|
| 4,994,966 | A * | 2/1991 | Hutchins | 704/9 |
| 5,351,189 | A * | 9/1994 | Doi et al. | 704/3 |
| 7,580,828 | B2 * | 8/2009 | D'Agostini | 704/2 |
| 2004/0030540 | A1 * | 2/2004 | Ovil et al. | 704/1 |

FOREIGN PATENT DOCUMENTS

| | | |
|---|---|---|
| KR | 10-2005-0034688 | 4/2005 |
| KR | 10-2008-0035346 | 4/2008 |
| KR | 10-0911834 | 8/2009 |

OTHER PUBLICATIONS

George Foster, et al. "Word-Completion: A First Step Toward Target-Text Mediated IMT", pp. 394-399.

Proceedings on computation linguistics, Aug. 1996.

Korean Office Action issued Feb. 11, 2010 in corresponding Korean Patent Application 10-2008-0066395.

Korean Office Action issued May 7, 2010 in corresponding Korean Patent Application 10-2008-0066395.

* cited by examiner

DEVICE AND METHOD FOR INTERACTIVE MACHINE TRANSLATION

CROSS-REFERENCE TO RELATED APPLICATION

This application claims priority to and the benefit of Korean Patent Application No. 2007-90102, filed Sep. 5, 2007, and No. 2008-66395, filed Jul. 9, 2008, the disclosure of which is incorporated herein by reference in its entirety.

BACKGROUND

1. Field of the Invention

The present invention relates to a device for interactive machine translation which improves translation quality through involvement of a user, and more particularly, to a device and method for real-time interactive machine translation which infers translation errors on the basis of information generated in the translation process and provides in real time a re-translated result according to collections made by the user.

This work was supported by the IT R&D program of MIC/IITA. [2006-S-037-02, Domain Customized Machine Translation Technology Development for Korean, Chinese, English].

2. Discussion of Related Art

The advent of computers marked the beginning of research into machine translation systems using computers to translate between various human languages. Early machine translation systems performed translation through a defined process. However, the defined process could not ensure high-quality translation since it could not perfectly reflect the characteristics of the natural language.

Since then, to complement incomplete machine translation, an Interactive Machine Translation (IMT) system based on an interaction between a user and a machine translation system has been developed. Such an IMT system corrects errors of a translation system through involvement of a user, thereby improving translation quality.

Figure 1:
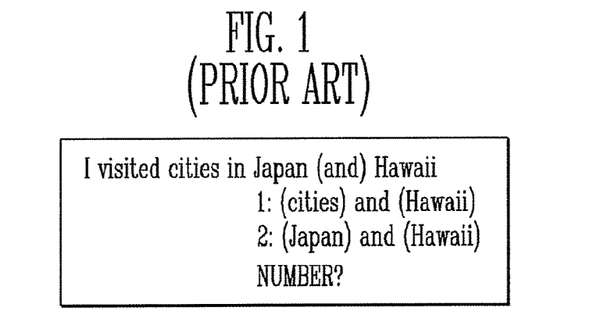
FIG. 1 illustrates an example of an interface provided by a conventional Interactive Machine Translation (IMT) system.

Referring to FIG. 1, a conventional IMT system generally asks a user questions to resolve structural ambiguity of a source language included in the original text, and receives the corresponding answers from the user, thereby performing translation. For example, the sentence "I visited cities in Japan and Hawaii" may have structural ambiguity with regard to the parallel range of "and". Here, the conventional IMT system may list words that can be objects in the parallel range and receive an object word selected by the user, thereby performing translation.

However, such a translation system can improve accuracy only when mistranslation is caused by misanalysis of the structure of the original text. Thus, the user's involvement in the translation process is restricted, and the system cannot get feedback on the result of the user's involvement. Consequently, the quality of the final translation result cannot be ensured.

SUMMARY OF THE INVENTION

The present invention is directed to a device and method for interactive machine translation which can perform high-quality translation by providing a user interface that facilitates user involvement in the translation process.

One aspect of the present invention provides a device for interactive machine translation, comprising: a machine translation engine comprising a morphological/syntactic analyzer for analyzing morphemes and sentences of an original text and generating original text analysis information, and a translation generator for generating a translation and translation generation information on the basis of the original text analysis information; and a user interface module for displaying sentence structures of the original text and the translation, and a relationship between the original text and the translation to a user on the basis of the original text analysis information and the translation generation information, and for receiving corrections to the original text or the translation from the user. Here, the machine translation engine performs re-translation on the basis of the user's corrections.

Another aspect of the present invention provides a method for interactive machine translation, comprising: analyzing morphemes and sentences of an original text to generate original text analysis information; generating a translation and translation generation information on the basis of the original text analysis information; displaying sentence structures of the original text and the translation, and a relationship between the original text and the translation to a user on the basis of the original text analysis information and the translation generation information; and performing re-translation on the basis of corrections to the original text or the translation received from the user.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings.

Figure 2:
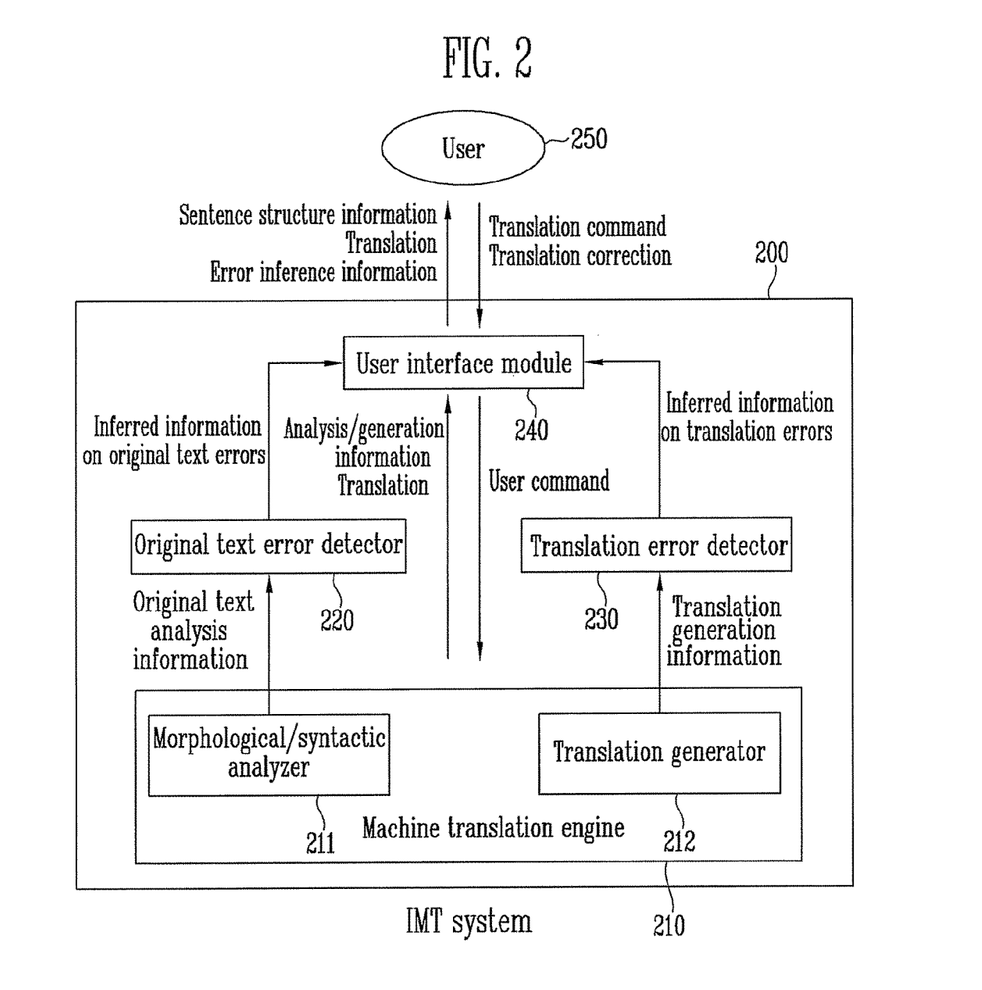
FIG. 2 is a block diagram of an IMT system according to an exemplary embodiment of the present invention.

FIG. 2 is a block diagram of an Interactive Machine Translation (IMT) system according to an exemplary embodiment of the present invention.

Referring to FIG. 2, an IMT system 200 comprises a machine translation engine 210, an original text error detector 220, a translation error detector 230 and a user interface module 240. The machine translation engine 210 includes a morphological/syntactic analyzer 211 for analyzing morphemes and syntax of the original text, and a translation generator 212 for generating a translation on the basis of the analysis. The original text error detector 220 receives the results of the morphological and sentence analysis of the original text from the machine translation engine 210 and determines by inference an erroneous part of the original text that may lead to a mistranslation. The translation error detector 230 receives translation generation information from the machine translation engine 210 and determines by inference an erroneous part of the translation that may have been mistranslated. The user interface module 240 receives a command related to translation from a user 250, transfers it to the machine translation engine 210, and provides a translated result and sentence structure information to the user 250.

The user 250 may request translation of the original text through the user interface module 240. The user interface module 240 transfers the request for translation to the machine translation engine 210, and the morphological/syntactic analyzer 211 included in the machine translation engine 210 analyzes morphemes and sentences of the original text and generates original text analysis information. Then, the translation generator 212 included in the machine translation engine 210 generates a translation corresponding to the original text on the basis of the original text analysis information, and simultaneously generates translation generation information.

The original text error detector 220 determines the inferred erroneous part of the original text that may be mistranslated in the original text on the basis of the original text analysis information, and the translation error detector 230 determines the inferred erroneous part of the translation that may have been mistranslated in the translation on the basis of the translation generation information. Here, the error detection process of the original text error detector 220 and the translation error detector 230 may be divided into an error analysis step, a correction candidate generation step, and a correction candidate sorting step.

First, in the error analysis step, an error in the original text or the translation is analyzed using data on a language model constructed from a corpus of a language used in the original text or the translation. In an exemplary embodiment, the original text error detector 220 and the translation error detector 230 may analyze a dependency relationship between words included in the original text or the translation, and estimate the reliability of the words using a previously constructed linguistic dependency model.

For example, when the sentence "그는 두통 때문에 아스피린을 먹었다." is translated into "He ate aspirin because of his headache", and "ate" is assumed to be a mistranslated word, the translation error detector 230 calculates a simultaneous occurrence probability between "ate" and "He", which is dependent on "ate" as a subjective, and a simultaneous occurrence probability between "ate" and "aspirin", which is dependent on "ate" as an objective, thereby determining a word reliability of "ate" Q(ate). When the word reliability of "ate" Q(ate) is equal to a specific value or less, the translation error detector 230 may infer "ate" to be an erroneous part of the translation.

Here, the linguistic dependency model may be generated by analyzing a dependency tree of a corpus of a target language and then storing n-gram co-occurrence information between words in a dependency relationship. For example, when the sentence is "someone took an aspirin", dependency analysis is performed to obtain the following results:

took→someone:dependency s
took→aspirin:dependency o
aspirin→an:dependency det

From the dependency analysis results, probabilities such as P(took|aspirin:o) and P(took|someone:s, aspirin:o) can be calculated and stored, such that the linguistic dependency model can be constructed. Here, "aspirin:o" denotes that "aspirin" is used as an object of "took", and "someone:s" denotes that "someone" is used as a subject of "took".

An erroneous part inferred through the error analysis step and related information may be provided to the user 250 through the user interface module 240, etc., which will be described later in this specification.

Second, in the correction candidate generation step, a list of candidate words or candidate phrases capable of replacing the inferred error candidate is generated. Here, a dictionary of the target language or search results obtained from the Internet may be used to generate a candidate word or candidate phrase.

In the above example, the translation error detector 230 searches for other translation candidates for "먹다", the original text word corresponding to "ate", in a translation dictionary, etc., thereby generating translation candidates such as "took", "had" and "drank".

Finally, in the correction candidate sorting step, word reliability values of the generated one or more correction candidates are calculated, and only translation candidates whose reliability values are equal to a reference value or more are sorted in order of decreasing reliability. Correction candidates for the erroneous part, provided through the correction candidate generation step and the correction candidate sorting step, may be provided to the user 250 through the user interface module 240 as described below.

Then, the user interface module 240 displays the original text, the translation and the sentence structure information to the user 250. Here, the user interface module 240 may display the inferred erroneous part of the original text and the inferred erroneous part of the translation respectively provided by the original text error detector 220 and the translation error detector 230 to be recognized by the user. When the user 250 positions a mouse pointer on a specific inferred erroneous part of the translation, the user interface module 240 may display the corresponding part in the original text or the translation, related error inference information, and so on. In an exemplary embodiment, the user interface module 240 may change a color or font of letters in an inferred erroneous part such that the user 250 can identify the part.

In addition, to facilitate involvement of the user 250, the user interface module 240 may enable the user 250 to correct errors in an original text window, a translation window, and a sentence structure information window manually. For example, the user 250 may correct an error by correcting simple sentence-specific information in the sentence structure information window using drag and drop operations of a mouse, or by responding to a question about an ambiguous part posed by the user interface module 240. Moreover, the user 250 may directly edit the corresponding part of the original text or the translation in the original text window and the translation window.

When the user 250 corrects the translated result through the user interface module 240, the user interface module 240 transfers content corrected by the user 250 to the machine translation engine 210 in real time, and provides again a re-translated result obtained through the translation process to the user 250. In this way, the user 250 may immediately know the accuracy of the translation resulting from the correction, and may additionally make corrections on the basis of the re-translated result.

Figure 3:
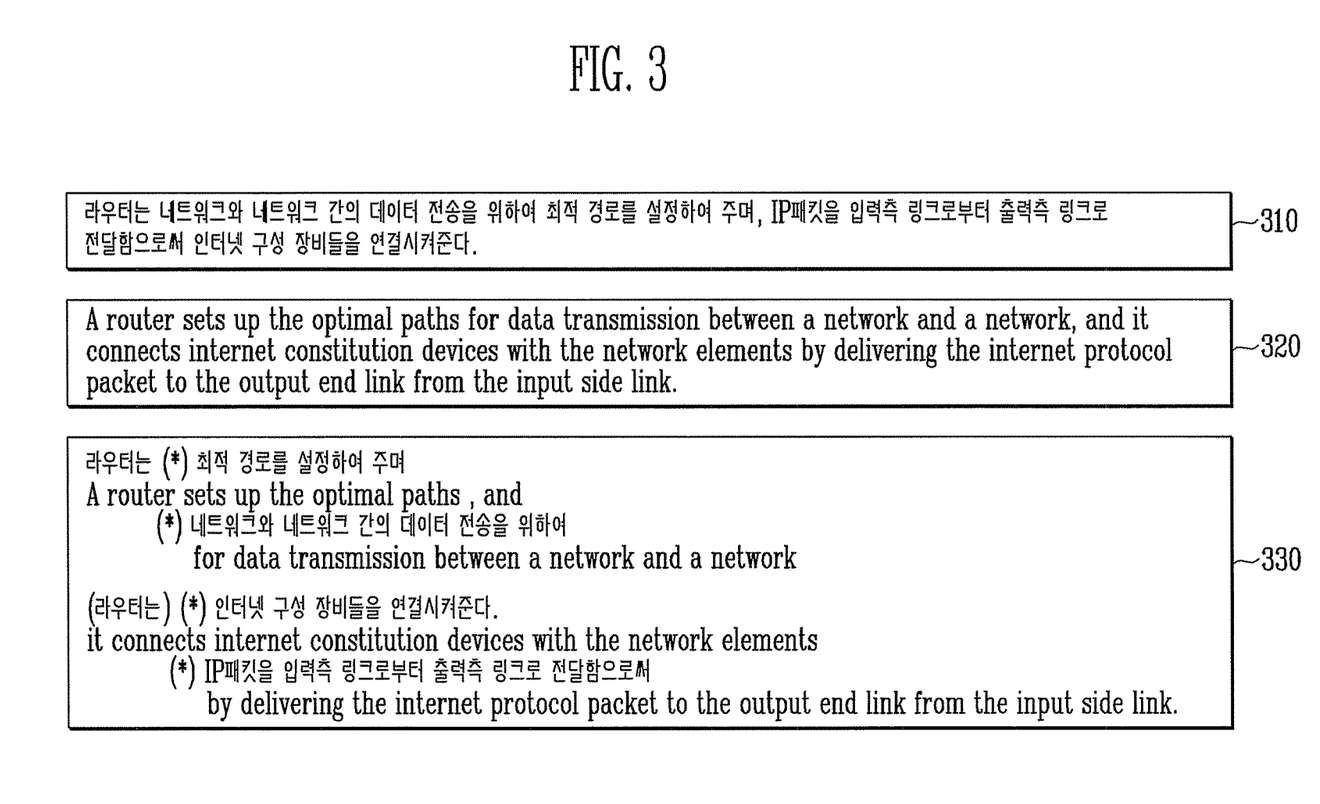
FIG. 3 illustrates an general user interface of an IMT system according to an exemplary embodiment of the present invention.

FIG. 3 illustrates an general user interface of an IMT system according to an exemplary embodiment of the present invention.

Referring to FIG. 3, a user interface displayed by a user interface module includes an original text window 310 for displaying an original text to be translated, a translation widow 320 for displaying a translation corresponding to the original text, and a sentence structure information window 330 for displaying sentence structures of the original text and the translation, and a relationship between phases constituting sentences. The sentence structure information window 330 displays the sentence structures of the original text and the translation, and the corresponding relationship in indented simple sentence units. To obtain more detailed analysis information within a simple sentence, the user 250 may click tree expansion information of the simple sentence and be provided with detailed sentence analysis information of the simple sentence. Also, the user may directly correct an incorrect sentence analysis result in the sentence structure information window 330 using the simple sentence-specific analysis information and the tree expansion information.

For example, a Korean sentence is displayed in the original text window 310, and an English sentence obtained by translating the Korean sentence is displayed in the translation window 320. In the sentence structure information window 330, the Korean sentence separated into four simple sentences is displayed together with phrases of the English translation corresponding to the respective simple sentences. Also, the sentence structure information window 330 displays dependency information between the simple sentences in an indented form, and (*) marks in simple sentences indicate positions at which other simple sentences beginning with the (*) mark are inserted.

Figure 4:
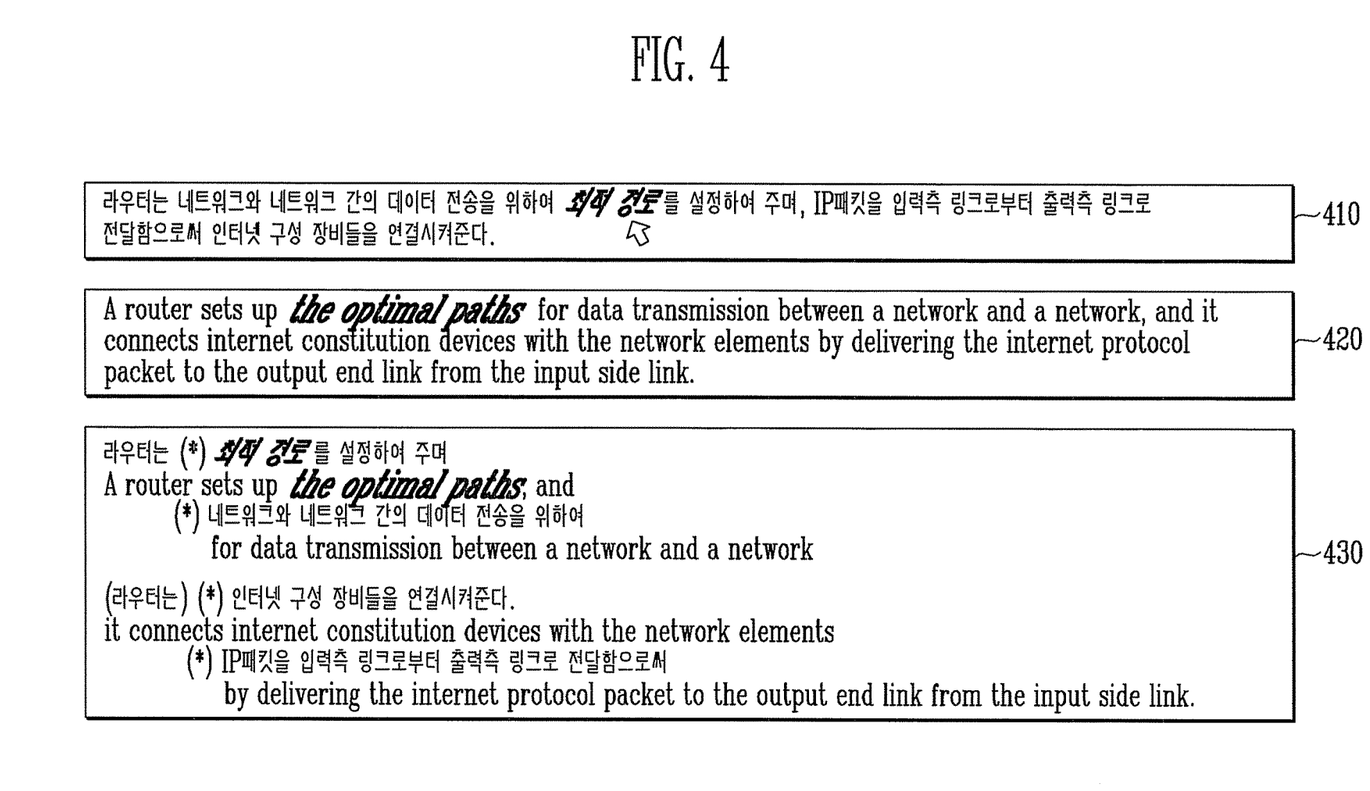
FIG. 4 illustrates a user interface displaying a relationship between an original text and a translation in an IMT system according to an exemplary embodiment of the present invention.

FIG. 4 illustrates a user interface displaying a relationship between an original text and a translation in an IMT system according to an exemplary embodiment of the present invention.

Referring to FIG. 4, a user interface module may display a corresponding relationship between words or phrases of an original text and a translation in response to a user input via means such as a mouse pointer such that the user can easily detect a translation error. In an exemplary embodiment, the user interface module may change a color or font of letters of the corresponding parts in the original text and the translation to emphasize the parts.

For example, when a user positions a mouse pointer on " 최적 경로 " in an original text window 410, " 최적 경로 " in the original text window, "the optimal paths" corresponding to " 최적 경로 " in a translation window 420, and " 최적 경로 " and "the optimal paths" in a sentence structure information window 430 are displayed in another font.

Figure 5:
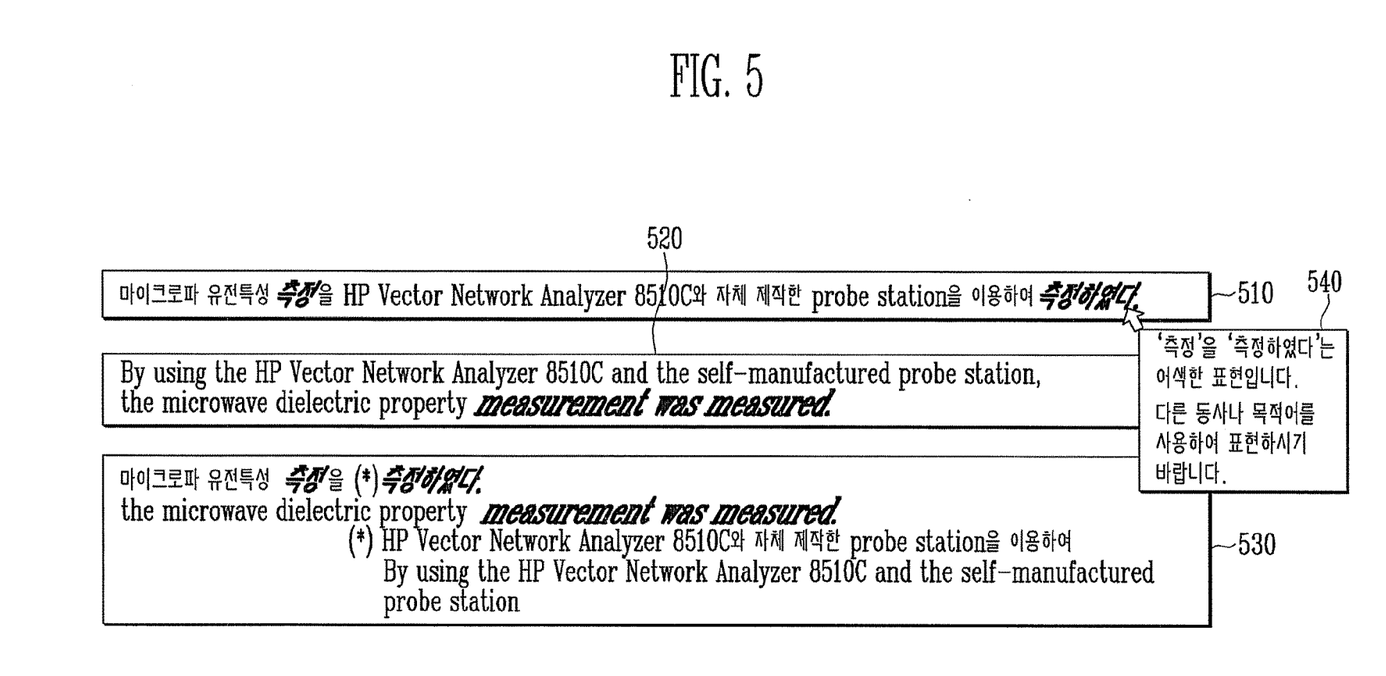
FIG. 5 illustrates a user interface displaying an inferred erroneous part of the original text and providing error inference information in an IMT system according to an exemplary embodiment of the present invention.

FIG. 5 illustrates a user interface displaying an inferred erroneous part of the original text and providing inferred error information in an IMT system according to an exemplary embodiment of the present invention.

Referring to FIG. 5, a user interface module marks an inferred erroneous part of the original text determined by an original text error detector such that a user can identify the part. Here, the user interface module displays error inference information in response to user input via means such as a mouse pointer and marks a part of a translation corresponding to the inferred erroneous part of the original text.

For example, when a user positions a mouse pointer on the inferred erroneous part of the original text, a pop-up window 540 displaying error inference information is generated. At the same time, a font of the inferred erroneous part of the original text and a part of a translation corresponding to the inferred erroneous part of the original text is changed in a translation window 520 and a sentence structure information window 530, such that the user can easily identify the parts.

Like " 측정을~ 측정하다 " in FIG. 5, when a noun and a verb having the noun as the stem of the verb exist in a dependency relationship in one sentence, the original text error detector determines the noun and the verb as inferred erroneous parts of the original text, and an original text window 510 changes the font of the parts and displays the original text. When a user positions a mouse pointer on the parts in the original text window 510, the translation window 520 and the sentence stricture information window 530 change a font of the inferred erroneous part of the original text and parts of a translation corresponding to the inferred erroneous part of the original text and display the original text and the translation, and the pop-up window 540 displays error inference information. Therefore, the user can easily correct the inferred erroneous part of the original text with reference to the error inference information.

Error inference information displayed in the pop-up window 540 may include display of a dividable point of a too-long sentence, a request for a user to check a part inferred to have a spelling error or a word spacing error, a request for checking the case of a postpositional word, a request for resolving structural ambiguity of parallel structure analysis, a request for modifying an excessively-overlapping adnominal clause, and a request for modifying a case in which an inflected word that cannot have double subjects or objects has double subjects or objects.

Figure 6:
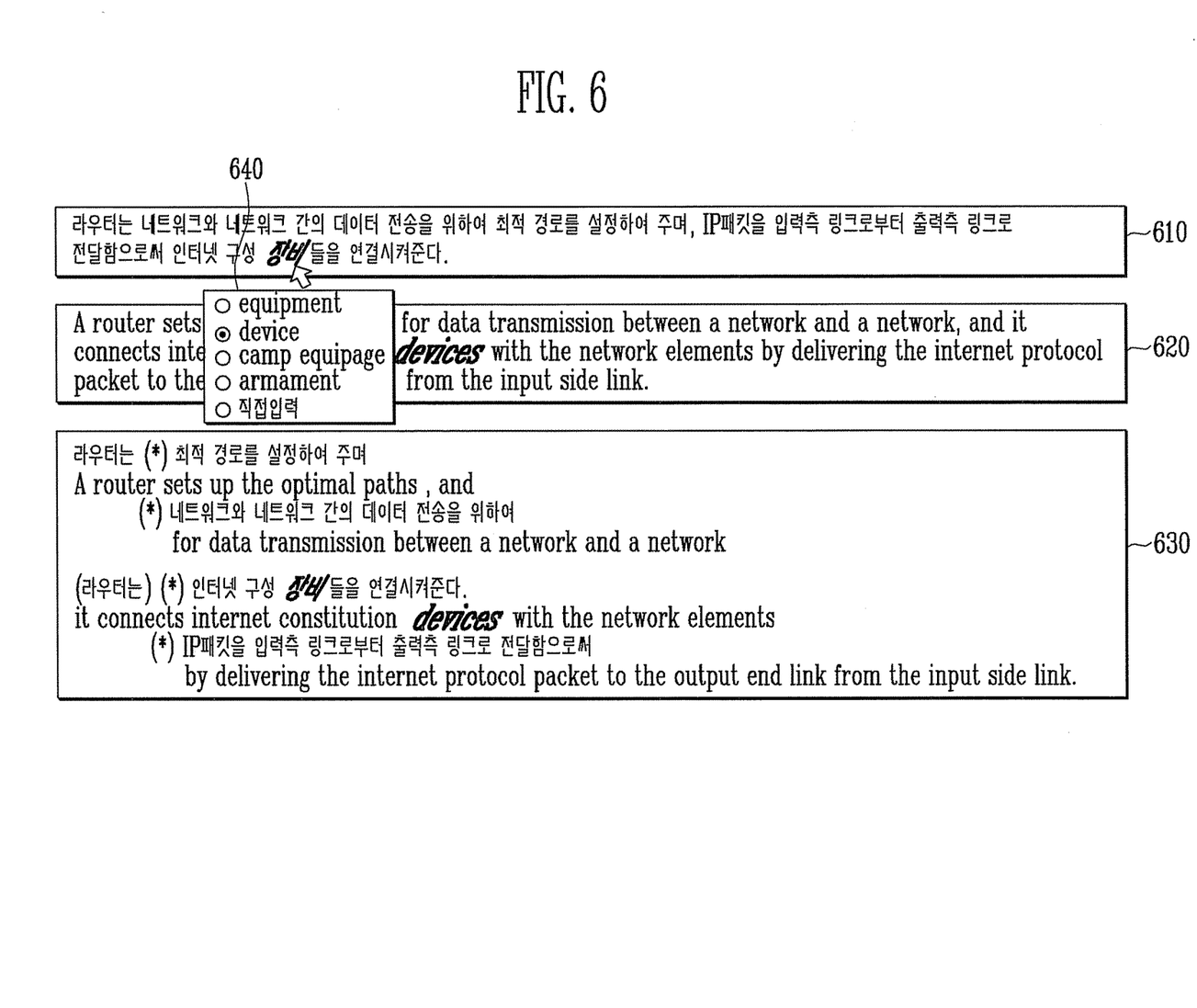
FIG. 6 illustrates a user interface correcting a word inferred to have been mistranslated in an IMT system according to an exemplary embodiment of the present invention.

FIG. 6 illustrates a user interface correcting a word inferred to have been mistranslated in an IMT system according to an exemplary embodiment of the present invention.

Referring to FIG. 6, a user interface module may display translated word candidates for a word inferred to have been mistranslated in response to an input of a user via means such as a mouse pointer.

For example, when a user positions a mouse pointer on " 장비 ", which is a word inferred to have been mistranslated in an original text window 610, a pop-up window 640 displaying translated word candidates corresponding to " 장비 " is generated. At the same time, a font of parts corresponding to " 장비 " indicated by the mouse pointer is changed in a translation window 620 and a sentence structure information window 630. The user may select one of the translated word candidates displayed in the pop-up window 640 and correct the word inferred to have been mistranslated, and the word corrected by the user is immediately reflected in a translated result.

In addition, the user may designate a range of a part to be corrected using a mouse. For example, when correcting " 인터넷 구성 장비 " instead of just " 장비 ", the user designates the corresponding part by dragging the mouse. Then, the user interface module recognizes the designated part as a new range and displays translated word candidates corresponding to " 인터넷 구성 장비 " in the pop-up window 640.

Figure 7:
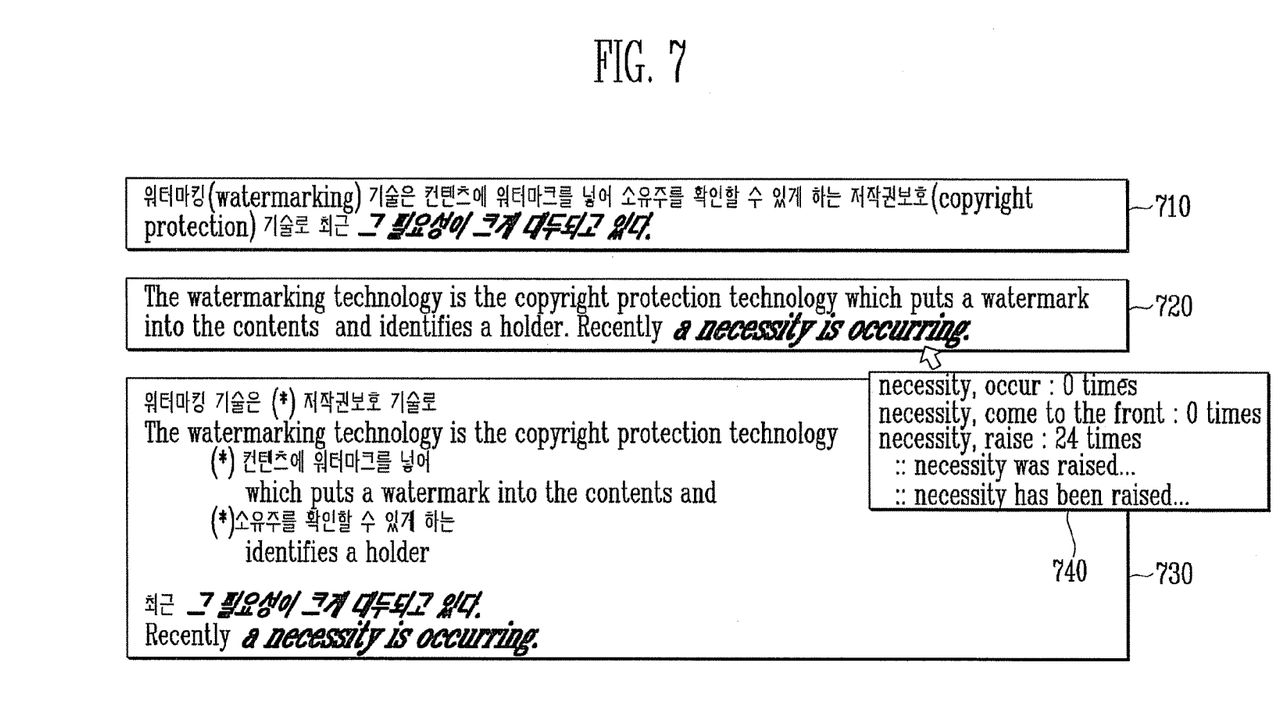
FIG. 7 illustrates a user interface displaying an part inferred to be a translation error in the IMT system according to an exemplary embodiment of the present invention.

FIG. 7 illustrates a user interface displaying an inferred erroneous part of the translation in the IMT system according to an exemplary embodiment of the present invention.

Referring to FIG. 7, a user interface module may mark an inferred erroneous part of the translation determined by a translation error detector, such that a user can identify the inferred erroneous part of the translation. Here, the user interface module may display translated phrase candidates for the inferred erroneous part of the translation in response to user input via means such as a mouse pointer, and may display a marked part of an original text corresponding to the inferred erroneous part of the translation to the user.

In addition, the user interface module may combine translated word candidates for words constituting the original text part corresponding to the inferred erroneous part of the translation, search the combinations in a database, e.g., English thesis database, including a large number of documents written in the same language as the translation, and display translated phrase candidates for the inferred erroneous part of the translation on the basis of the search results. In an exemplary embodiment, the search results may include the number of times that each combination of the translated word candidates is found.

For example, when the user positions a mouse pointer on "a necessity is occurring", marked as an inferred erroneous part of the translation in a translation window 720, a font of parts corresponding to the inferred erroneous part of the translation may be changed in an original text window 710 and a sentence structure information window 730. At the same time, the user interface module may search combinations between "necessity" corresponding to "필요성" in the original text "그 필요성이 크게 대두되고 있다" corresponding to the inferred erroneous part of the translation, and "occur", "come to the front", "raise" and "show itself" corresponding to "대두되다", in an English thesis database, and may display the search results in a pop-up window 740. Therefore, the user can connect the inferred erroneous part of the translation with reference to translated phrase candidates, e.g., "necessity was raised" and "necessity has been raised", displayed as the search results in the pop-up window 740.

Meanwhile, when an inferred erroneous part of the translation consists of one word, the user interface module may directly search candidates for the word constituting the inferred erroneous part of the translation in a database and display the search results in a pop-up window.

According to embodiments of the present invention, a user interface that enables a user to effectively recognize a mistranslated part and a cause of the mistranslation and correct the mistranslated part, and rapidly produces a re-translated result according to correction is provided. Thus, it is possible to perform high-quality translation to the user's satisfaction.

Unlike a conventional machine translation system, the embodiments of the present invention enable the user to be involved in the entire translation process, thereby providing a high-quality translation matching the fluency of the user.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device for interactive machine translation, comprising:
   a machine translation engine comprising a morphological/syntactic analyzer for analyzing morphemes and sentences of an original text and generating original text analysis information, and a translation generator for generating a translation and translation generation information on the basis of the original text analysis information;
   a user interface module for displaying sentence structures of the original text and the translation, and a corresponding relationship between the original text and the translation to a user on the basis of the original text analysis information and the translation generation information, and for receiving corrections to the original text, the translation, the sentence structures of the original text and the translation, or the corresponding relationship between the original text and the translation from the user,
   an original text error detector for determining an inferred erroneous part of the original text on the basis of the original text analysis information, and
   a translation error detector for determining an inferred erroneous part of the translation on the basis of the translation generation information,
   wherein the user interface module displays the inferred erroneous part of the original text and the inferred erroneous part of the translation to the user, the machine translation engine regenerates the original text, original text analysis information, the translation or translation generation information on the basis of the user's corrections, and the user interface module displays corresponding parts between the original text and the translation on the basis of user input, and changes a color or font of letters of the corresponding parts between the original text and the translation on the basis of the user input.

2. The device according to claim 1, wherein the user interface module displays the sentence structures of the original text and the translation and the corresponding relationship between the original text and the translation in indented simple sentence units.

3. The device according to claim 1, wherein the user interface module displays error inference information on the inferred erroneous part of the original text in response to user input.

4. The device according to claim 1, wherein the user interface module displays a translated word candidate for a word included in the original text in response to user input.

5. The device according to claim 1, wherein the user interface module displays a translated phrase candidate for the inferred erroneous part of the translation in response to user input.

6. The device according to claim 5, wherein the translated phrase candidate is displayed on the basis of search results obtained from a database including a plurality of documents written in the same language as the translation.

7. A method for interactive machine translation, in which a machine translation device translates an original text into a translation on the basis of interaction with a user, the method comprising:
   analyzing morphemes and sentences of the original text to generate original text analysis information;
   generating the translation and translation generation information on the basis of the original text analysis information;
   displaying sentence structures of the original text and the translation, and a corresponding relationship between the original text and the translation to the user on the basis of the original text analysis information and the translation generation information; and
   regenerating the original text, original text analysis information, the translation or translation generation information on the basis of user's corrections to the original text, the translation, the sentence structures of the original text and the translation, or the corresponding relationship between the original text and the translation from the user, the method further comprising:

determining an inferred erroneous part of the original text and the translation on the basis of the original text analysis information and the translation generation information; and displaying the inferred erroneous part of the original text and the translation to the user, wherein the displaying the sentence structures of the original text and the translation, and the corresponding relationship between the original text and the translation to the user comprises:

displaying corresponding parts between the original text and the translation to the user in response to user input; and changing a color or font of letters of the corresponding parts between the original text and the translation on the basis of the user input.

8. The method according to claim 7, wherein the sentence structures of the original text and the translation and the corresponding relationship between the original text and the translation are displayed in indented simple sentence units.

9. The method according to claim 7, further comprising:
displaying error inference information on the inferred erroneous part of the original text on the basis of user input.

10. The method according to claim 7, further comprising:
displaying a translated word candidate for a word included in the original text on the basis of user input.

11. The method according to claim 7, further comprising:
displaying a translated phrase candidate for the inferred erroneous part of the translation on the basis of user input.

12. The method according to claim 11, wherein the translated phrase candidate is displayed on the basis of search results obtained from a database including a plurality of documents written in the same language as the translation.

\* \* \* \* \*